(12) United States Patent
Jennis

(10) Patent No.: US 11,630,328 B1
(45) Date of Patent: Apr. 18, 2023

(54) SUNGLASSES WITH CLEAR BIFOCALS

(71) Applicant: Tara L. Jennis, Bradenton, FL (US)

(72) Inventor: Tara L. Jennis, Bradenton, FL (US)

( * ) Notice: Subject to any disclaimer, the term of this patent is extended or adjusted under 35 U.S.C. 154(b) by 0 days.

(21) Appl. No.: 17/585,432

(22) Filed: Jan. 26, 2022

(51) Int. Cl.
G02C 7/06 (2006.01)
G02C 7/12 (2006.01)

(52) U.S. Cl.
CPC .................. G02C 7/06 (2013.01); G02C 7/12 (2013.01)

(58) Field of Classification Search
CPC ............................ G02C 7/06; G02C 7/12
USPC ................. 351/41, 159.01, 159.41
See application file for complete search history.

(56) References Cited

U.S. PATENT DOCUMENTS

| 3,958,867 A | | 5/1976 | Morgan | |
|---|---|---|---|---|
| 5,059,561 A | * | 10/1991 | Ciolek | C03C 14/006 501/72 |
| 5,682,220 A | | 10/1997 | Sherman et al. | |
| 6,138,286 A | * | 10/2000 | Robrahn | G02C 7/104 351/44 |
| 6,932,473 B2 | | 8/2005 | DeFazio | |
| 6,976,757 B2 | | 12/2005 | DeFazio | |
| 7,093,935 B2 | | 8/2006 | Parnell | |
| 7,537,335 B2 | | 5/2009 | Renard | |
| 7,753,518 B2 | * | 7/2010 | Lam | G02C 5/2218 351/110 |
| 2004/0046927 A1 | | 3/2004 | Montgomery | |
| 2007/0046888 A1 | * | 3/2007 | Kurzrok | G02C 7/105 351/45 |
| 2018/0299599 A1 | * | 10/2018 | Kumar | B29D 11/00884 |

FOREIGN PATENT DOCUMENTS

DE 202020000134 U1 * 4/2020 ............. G02C 7/06

* cited by examiner

Primary Examiner — Tuyen Tra
(74) Attorney, Agent, or Firm — Cramer Patent & Design, PLLC; Aaron R. Cramer

(57) ABSTRACT

The present invention is directed to sunglasses with clear bifocals. The sunglasses with clear bifocals may comprise a pair of sunglasses having bifocal lenses that provide far distance correction through the top of the bifocal lenses and near distance correction through the bottom of the bifocal lenses. A portion of the bifocal lenses providing the far distance correction may be tinted to block sunlight and a portion of the bifocal lenses providing the near distance correction may be clear. As a non-limiting example, the pair of sunglasses may provide protection from bright sunlight while driving without interfering with the ability to read the instrument panel which is less brightly lit.

9 Claims, 3 Drawing Sheets

SUNGLASSES WITH CLEAR BIFOCALS

RELATED APPLICATIONS

Non-applicable.

FIELD OF THE INVENTION

The present invention generally relates to sunglasses and more specifically to sunglasses with clear bifocal lenses.

BACKGROUND OF THE INVENTION

Many of us over the age of forty-five develop a condition called presbyopia, which is a deterioration in the ability of the eye's natural lens to expand or contract in order to focus on close objects one instant and far away ones the next. As a result, the use of prescription bifocals is usually prescribed. This allows the user to use the distance portion of the lens to view far away objects, and the small near portion of the lens to view close up objects such as text on reading material.

Many of us who spend time outdoors may have a pair of prescription bifocal tinted to protect one's eyes from bright sunlight and UV radiation. While such tinting works great for the distance portion of the lens, the tinting on the near portion of the lens makes viewing text in a book, on an outdoor restaurant menu, or even a vehicle's dashboard difficult. Accordingly, there exists a need for a means by which a tinted bifocal prescription eyewear can accommodate both near and far viewing. The development of the sunglasses with clear bifocals fulfills this need.

SUMMARY OF THE INVENTION

The disadvantages of the prior art are overcome by the present invention in providing a sunglasses with clear bifocals that has a pair of sunglasses having a pair of bifocal lenses, a frame, and a pair of temples, and a portion of the pair of bifocal lenses having far distance correction are tinted to block sunlight and a portion of the pair of bifocal lenses providing the near distance correction is clear, wherein the pair of sunglasses are adapted to be worn by a user on a user's head with the pair of temples resting on a user's ears and the frame is adapted to be supported by a user's nose.

The pair of bifocal lenses may provide far distance correction through a top of the pair of bifocal lenses. The pair of bifocal lenses may provide near distance correction through a bottom of the pair of bifocal lenses. The pair of sunglasses may provide protection from bright sunlight while driving without interfering with reading an instrument panel which is less brightly lit. The pair of bifocal lenses may be coupled to the frame which is adapted to hold the bifocal lenses vertically in front of a user's eyes. The pair of bifocal lenses may be adapted to correct the user's vision to prevent sunlight from reaching the user's eyes. The pair of bifocal lenses may include a first optical field and a second optical field. The first optical field may be a first optical correction which is far distance correction. The second optical field may be a second optical correction which is near distance correction. The second optical field may be positioned below the first optical field on each of the individual bifocal lens such that each of the individual bifocal lens may be adapted for the user to look through the top of each of the individual bifocal lens to see distance one or more objects and to look through the bottom of the individual bifocal lens to see the one or more close objects. The first optical field may include a plurality of tinting to reduce sunlight that passes through the first optical field. The tinting may vary across the first optical field such that the tinting produces a gradient oriented such that darker shades of the tinting appear at a top of the first optical field and lighter shades of the tinting appear at the bottom of the first optical field. The tinting may be in the range of 8%-50% light transmission. The gradient may transition to 100% light transmission at or above an upper edge of the second optical field. The frame may include a pair of rims for holding the bifocal lenses and a bridge between the pair of rims. The sunglasses with clear bifocals may further comprise a plurality of nose pads coupled to the pair of rims and/or the bridge that are adapted to rest on the user's nose that distribute weight from the pair of sunglasses and thus make the pair of sunglasses more comfortable to wear. The pair of temples may be a pair of armatures that protrude from the frame in a rearward direction and are adapted to pass along the sides of the user's head and to rest on the user's ears. The pair of temples may be hingedly coupled to the frame via a pair of hinges such that the pair of temples fold against the frame when the pair of sunglasses are not being worn. The frame may be made of material selected from the group consisting of metal, plastic, wood, resins, or any combination thereof. The pair of temples may be made of material selected from the group consisting of metal, plastic, wood, resins, or any combination thereof.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
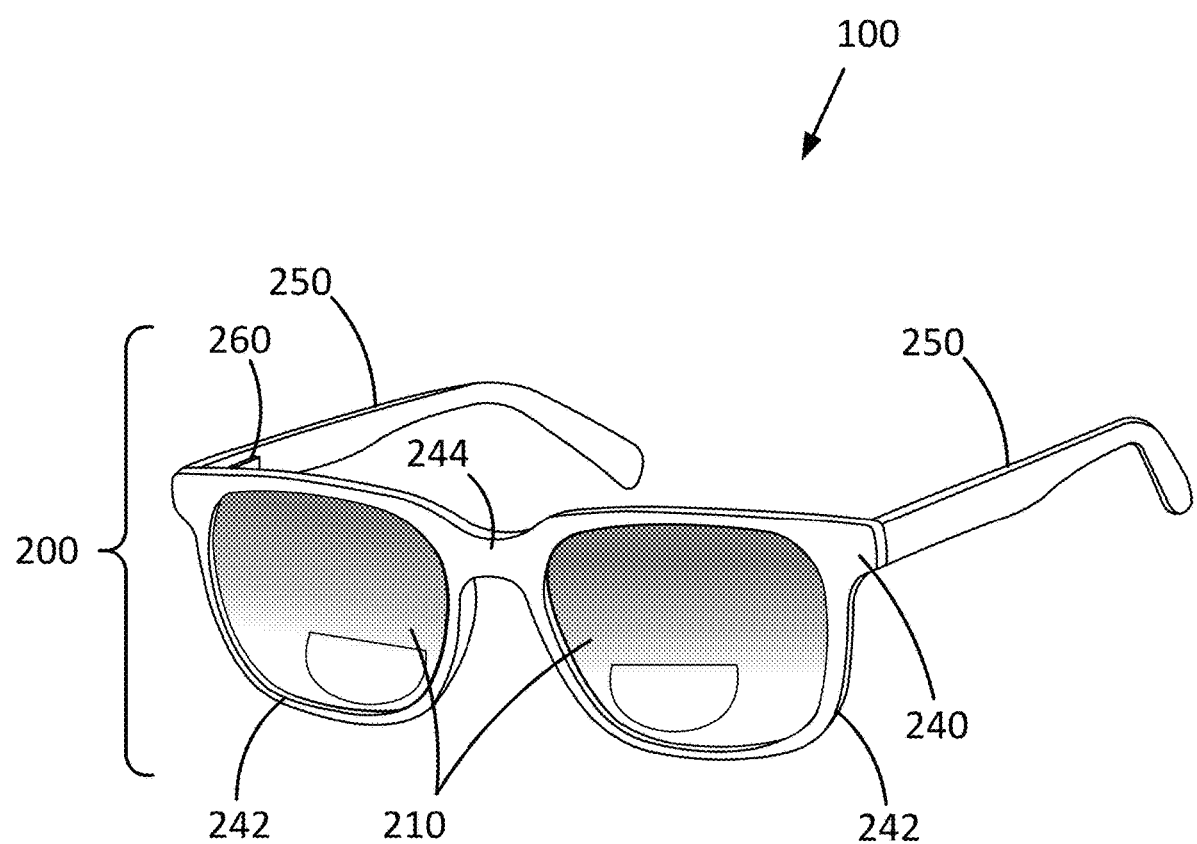
FIG. 1 is an isometric view of sunglasses with clear bifocals, according to an embodiment of the present invention.
Figure 2:
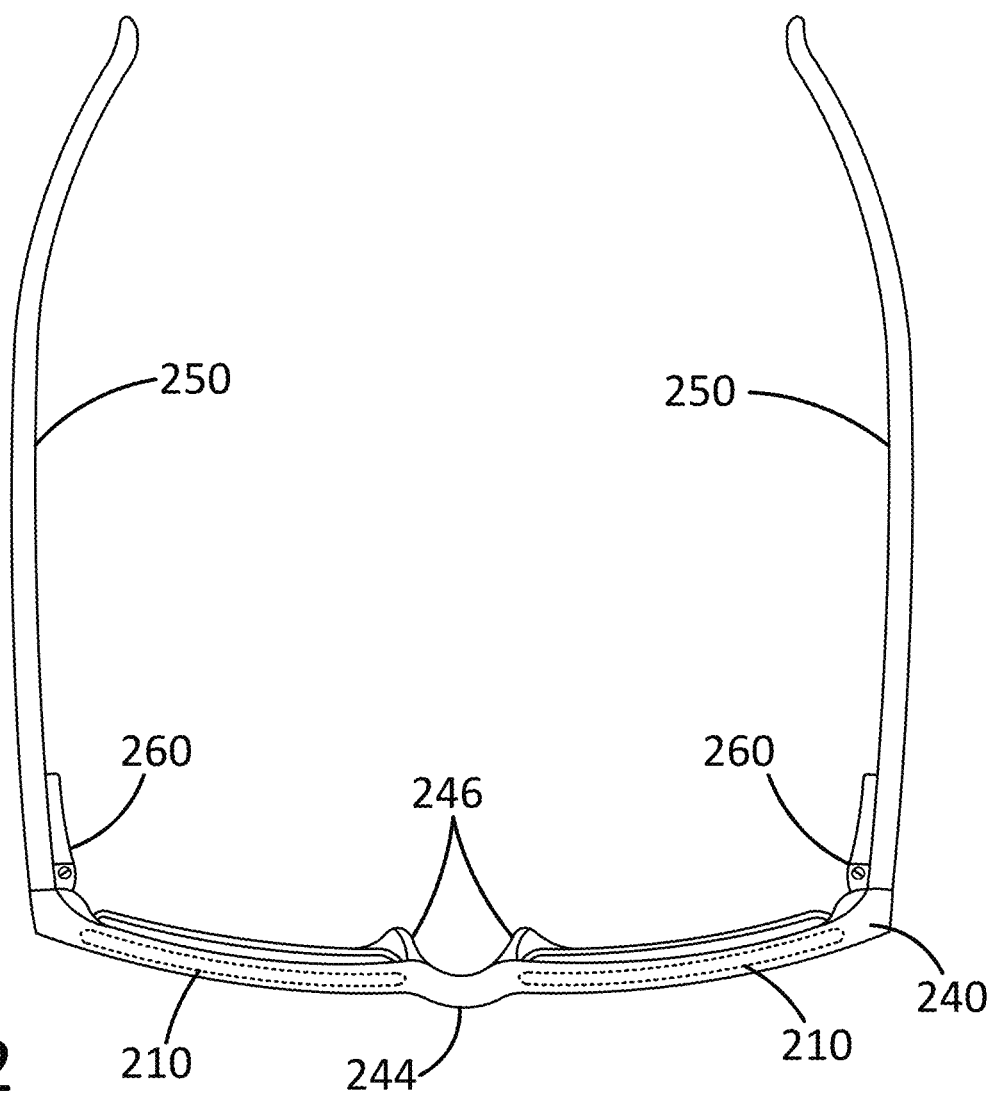
FIG. 2 is a top view of sunglasses with clear bifocals, according to an embodiment of the present invention.
Figure 3:
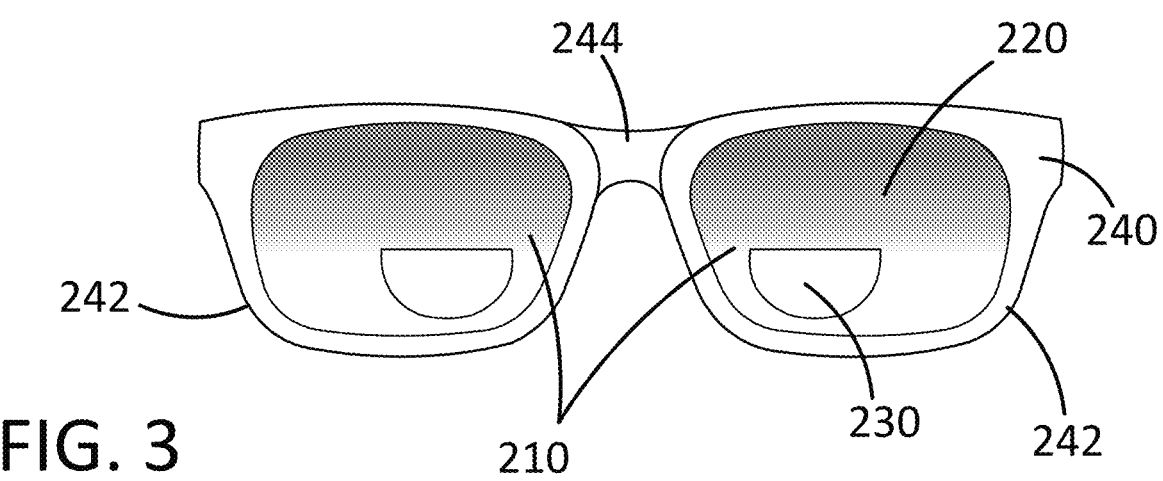
FIG. 3 is a front view of sunglasses with clear bifocals, according to an embodiment of the present invention.
Figure 4:
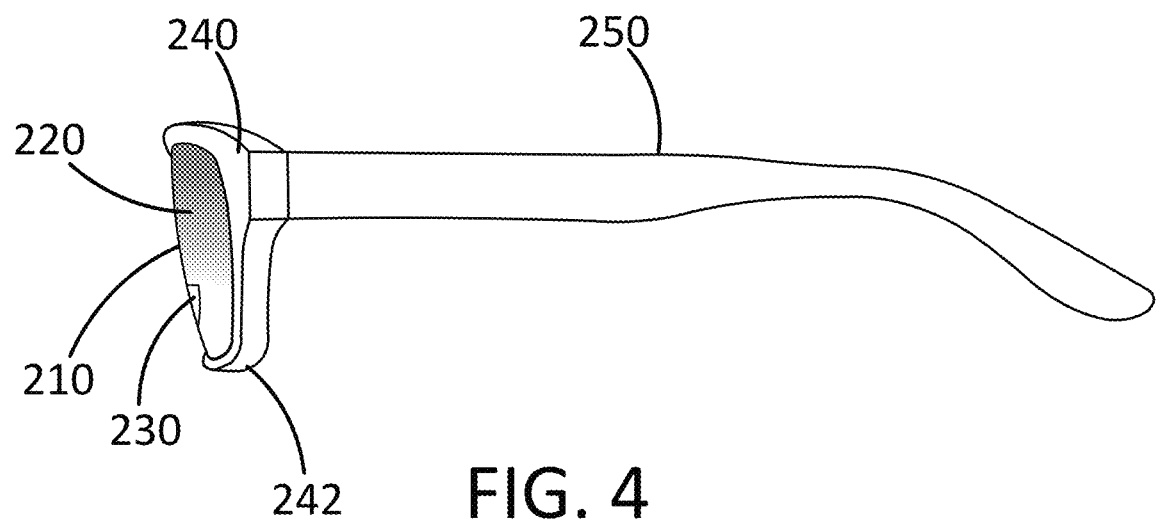
FIG. 4 is a side view of sunglasses with clear bifocals, according to an embodiment of the present invention.
Figure 5:
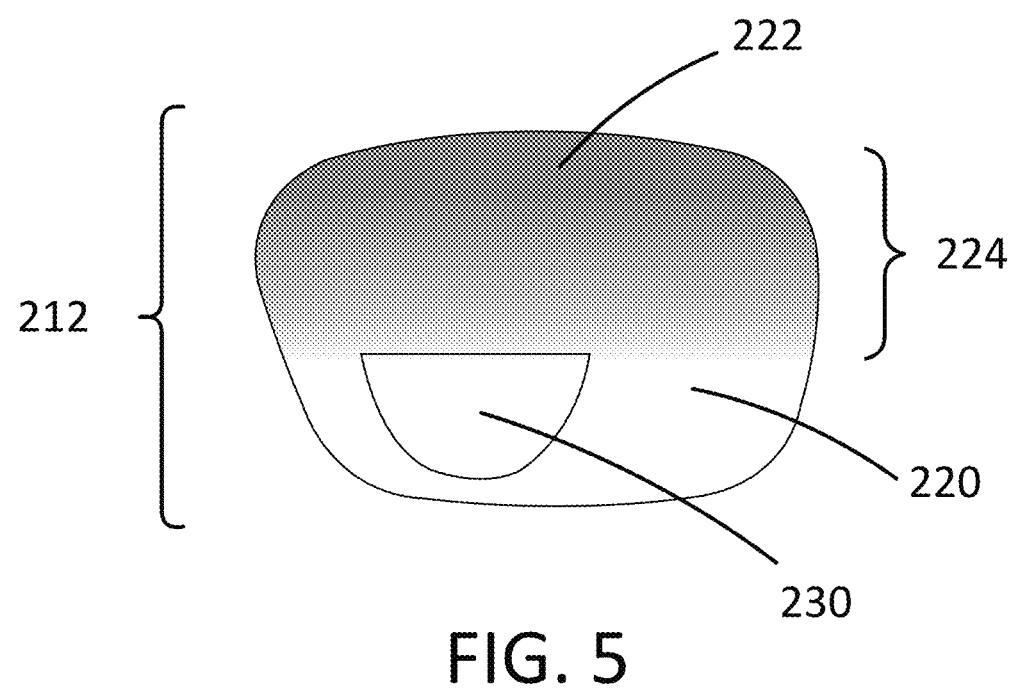
FIG. 5 is a detail view of sunglasses with clear bifocals, according to an embodiment of the present invention, illustrating an individual bifocal lens.

DESCRIPTIVE KEY 100 sunglasses with clear bifocals
200 sunglasses
210 bifocal lenses
212 individual bifocal lens
220 first optical field
222 tinting
224 gradient
230 second optical field
240 frame
242 rim
244 bridge
246 nose pad
250 temples
260 hinge

DESCRIPTION OF THE INVENTION

The present invention is directed to sunglasses with clear bifocals (herein described as the "invention") 100. The invention 100 may comprise a pair of sunglasses 200 having bifocal lenses 210 that provide far distance correction through the top of the bifocal lenses 210 and near distance correction through the bottom of the bifocal lenses 210. A portion of the bifocal lenses 210 providing the far distance correction may be tinted to block sunlight and a portion of the bifocal lenses 210 providing the near distance correction may be clear. As a non-limiting example, the pair of sunglasses 200 may provide protection from bright sunlight while driving without interfering with the ability to read the instrument panel which is less brightly lit.

The pair of sunglasses 200 may comprise the bifocal lenses 210, a frame 240, and a pair of temples 250. The pair of sunglasses 200 may be adapted to be worn by a user on the user's head with the pair of temples 250 resting on the user's ears and the frame 240 supported by the user's nose.

The bifocal lenses 210 may be coupled to the frame 240. The frame 240 may be adapted to hold the bifocal lenses 210 vertically in front of the user's eyes. The bifocal lenses 210 may be adapted to correct the user's vision and/or to prevent sunlight from reaching the user's eyes.

An individual bifocal lens 212 selected from the bifocal lenses 210 may comprise a first optical field 220 and a second optical field 230. The first optical field 220 may provide a first optical correction which may be the far distance correction. In some embodiments, (wherein the pair of bifocal lenses include a first optical field and a second optical field.) The second optical field 230 may provide a second optical correction which may be the near distance correction. The second optical field 230 may be positioned below the first optical field 220 on the individual bifocal lens 212 such that the individual bifocal lens 212 is adapted for the user to look through the top of the individual bifocal lens 212 to see distance objects and to look through the bottom of the individual bifocal lens 212 to see close objects.

The first optical field 220 may comprise tinting 222 to reduce the amount of sunlight that passes through the first optical field 220. The degree of the tinting 222 may determine the darkness of the first optical field 220. Darker lenses may block more sunlight and lighter lenses may pass more sunlight. As a non-limiting example, the degree of the tinting 222 may vary from eight percent to fifty percent (8-50%) light transmission.

The tinting 222 may vary across the first optical field 220 such that the tinting 222 produces a gradient 224. The gradient 224 may be oriented such that darker shades of the tinting 222 appear at the top of the first optical field 220 and lighter shades of the tinting 222 appear at the bottom of the first optical field 220. In some embodiments, the gradient 224 may transition to one hundred percent (100%) light transmission at or above the upper edge of the second optical field 230.

In some embodiments, each of the individual bifocal lenses 212 may provide a different amount of optical correction. The first optical correction provided by the individual bifocal lens 212 on the left side may be different from the first optical correction provided by the individual bifocal lens 212 on the right side and/or the second optical correction provided by the individual bifocal lens 212 on the left side may be different from the second optical correction provided by the individual bifocal lens 212 on the right side.

The frame 240 may comprise a pair of rims 242 for holding the bifocal lenses 210 and a bridge 244 between the pair of rims 242. Nose pads 246 coupled to the pair of rims 242 and/or the bridge 244 may be adapted to rest on the user's nose. The nose pads 246 may distribute the weight of the pair of sunglasses 200 and thus make the pair of sunglasses 200 more comfortable to wear. As non-limiting examples, the nose pads 246 may be molded onto the frame 240 or may comprise swiveling pads coupled to the frame 240 via adjustable armatures.

The pair of temples 250 may be armatures that protrude from the frame 240 in a rearward direction. The pair of temples 250 may be adapted to pass along the sides of the user's head and to rest on the user's ears. In some embodiments, the pair of temples 250 may be hingedly coupled to the frame 240 via a pair of hinges 260 such that the pair of temples 250 may fold against the frame 240 when the pair of sunglasses 200 are not being worn.

As non-limiting examples, the frame 240 and the pair of temples 250 may be made of metal, plastic, wood, resins, or any combination thereof. As non-limiting examples, the frame 240 and the pair of temples 250 may comprise a color scheme using one (1) or more solid colors, a pattern of colors, transparency, or any combination thereof. In some embodiments, the bifocal lenses 210, in part or in whole, may comprise one or more coatings that reduce glare, block UV light, or both. In some embodiments, the bifocal lenses 210, in part or in whole, may comprise one (1) or more films that polarize the bifocal lenses 210 such that transmission of reflected light through the bifocal lenses 210 is reduced.

Although the invention 100 has been described in terms of bifocal lenses 210 those skilled in the art will recognize that the concepts described herein may be equally applicable to trifocal and other multi-focal lenses resulting in various embodiments of the present invention which will result in an improved invention, yet all of which will fall within the spirit and scope of the present invention as defined in the following claims. Accordingly, the invention 100 is to be limited only by the scope of the following claims and their equivalents.

In use, the user may don the pair of sunglasses 200 by placing the pair of temples 250 along the side of the user's head, resting on the user's ears, and by resting the nose pads 246 of the frame 240 on the user's nose. The user may benefit from a reduction of sunlight passing through the first optical field 220 and/or corrected vision while looking at distance objects and may benefit from corrected vision while looking at nearby objects through the second optical field 230 without a reduction in the amount of light passing through the second optical field 230.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:
1. A sunglasses with clear bifocals, consisting of:
a pair of sunglasses having a pair of bifocal lenses, a frame, and a pair of temples; and
a portion of the pair of bifocal lenses having far distance correction are tinted to block sunlight and a portion of the pair of bifocal lenses providing the near distance correction is clear;

wherein the pair of sunglasses are adapted to be worn by a user on a user's head with the pair of temples resting on a user's ears and the frame is adapted to be supported by a user's nose;

wherein the pair of bifocal lenses include a first optical field and a second optical field;

wherein the first optical field is a first optical correction which is far distance correction;

wherein the second optical field is a second optical correction which is near distance correction;

wherein the second optical field is positioned below the first optical field on each of the individual bifocal lens such that each of the individual bifocal lens is adapted for the user to look through the top of each of the individual bifocal lens to see distance one or more objects and to look through the bottom of the individual bifocal lens to see the one or more close objects;

wherein the first optical field includes a plurality of tinting to reduce sunlight that passes through the first optical field;

wherein the tinting varies across the first optical field such that the tinting produces a gradient oriented such that darker shades of the tinting appear at a top of the first optical field and lighter shades of the tinting appear at the bottom of the first optical field;

wherein the tinting is in the range of 8%-50% light transmission;

wherein the pair of temples are hingedly coupled to the frame via a pair of hinges such that the pair of temples fold against the frame when the pair of sunglasses are not being worn;

wherein the frame is made of material selected from the group consisting of metal, plastic, wood, resins, or any combination thereof;

wherein the pair of temples are made of material selected from the group consisting of metal, plastic, wood, resins, or any combination thereof; and further comprising a plurality of nose pads coupled to the pair of rims and/or the bridge that are adapted to rest on the user's nose that distribute weight from the pair of sunglasses and thus make the pair of sunglasses more comfortable to wear.

2. The sunglasses with clear bifocals, according to claim 1, wherein the pair of bifocal lenses provide far distance correction through a top of the pair of bifocal lenses.

3. The sunglasses with clear bifocals, according to claim 1, wherein the pair of bifocal lenses provide near distance correction through a bottom of the pair of bifocal lenses.

4. The sunglasses with clear bifocals, according to claim 1, wherein the pair of sunglasses provide protection from bright sunlight while driving without interfering with reading an instrument panel which is less brightly lit.

5. The sunglasses with clear bifocals, according to claim 1, wherein the pair of bifocal lenses are coupled to the frame which is adapted to hold the bifocal lenses vertically in front of a user's eyes.

6. The sunglasses with clear bifocals, according to claim 5, wherein the pair of bifocal lenses are adapted to correct the user's vision to prevent sunlight from reaching the user's eyes.

7. The sunglasses with clear bifocals, according to claim 1, wherein a plurality of gradient transitions are to 100% light transmission at or above an upper edge of the second optical field.

8. The sunglasses with clear bifocals, according to claim 1, wherein the frame includes a pair of rims for holding the bifocal lenses and a bridge between the pair of rims.

9. The sunglasses with clear bifocals, according to claim 1, wherein the pair of temples are a pair of armatures that protrude from the frame in a rearward direction and are adapted to pass along the sides of the user's head and to rest on the user's ears.

* * * * *